(12) United States Patent
Corre et al.

(10) Patent No.: US 7,510,015 B2
(45) Date of Patent: Mar. 31, 2009

(54) PACKERS AND METHODS OF USE

(75) Inventors: Pierre-Yves Corre, Eu (FR); Philippe Hocquet, Vanves (FR); Stephane Metayer, Abbeville (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 378 days.

(21) Appl. No.: 11/361,531

(22) Filed: Feb. 23, 2006

(65) Prior Publication Data

US 2007/0193736 A1 Aug. 23, 2007

(51) Int. Cl.
*E21B 33/127* (2006.01)
(52) U.S. Cl. .................... 166/387; 166/187; 277/343
(58) Field of Classification Search ............. 166/187, 166/387; 277/334; 138/93
See application file for complete search history.

(56) References Cited

U.S. PATENT DOCUMENTS

| | | | |
|---|---|---|---|
| 3,915,229 A | 10/1975 | Nicolas | |
| 4,500,095 A | 2/1985 | Schisler et al. | |
| 4,614,346 A * | 9/1986 | Ito | 277/334 |
| 4,830,105 A | 5/1989 | Petermann | |
| 4,886,117 A * | 12/1989 | Patel | 277/334 |
| 4,923,007 A | 5/1990 | Sanford et al. | |
| 5,183,108 A * | 2/1993 | Lee et al. | 277/334 |
| 5,205,567 A * | 4/1993 | Quinlan et al. | 277/334 |
| 5,340,626 A * | 8/1994 | Head | 277/334 |
| 5,358,039 A | 10/1994 | Fordham | |
| 5,361,836 A | 11/1994 | Sorem et al. | |
| 5,404,947 A | 4/1995 | Sorem et al. | |
| 5,439,053 A | 8/1995 | Eslinger et al. | |
| 5,605,195 A | 2/1997 | Eslinger et al. | |
| 5,613,555 A | 3/1997 | Sorem et al. | |
| 5,687,795 A | 11/1997 | Patel et al. | |
| 5,778,982 A * | 7/1998 | Hauck et al. | 166/387 |
| 6,315,050 B2 | 11/2001 | Vaynshteyn et al. | |
| 6,513,600 B2 | 2/2003 | Ross | |
| 6,564,876 B2 | 5/2003 | Vaynshteyn et al. | |
| 6,938,698 B2 | 9/2005 | Coronado | |
| 2002/0014339 A1 | 2/2002 | Ross | |
| 2006/0090905 A1 | 5/2006 | Brennan, III et al. | |
| 2007/0261847 A1 | 11/2007 | Saltel | |

FOREIGN PATENT DOCUMENTS

| | | |
|---|---|---|
| EP | 0528327 | 2/1993 |
| EP | 0528328 | 2/1993 |
| EP | 0702747 | 3/1996 |
| FR | 2875286 A1 | 3/2006 |
| WO | 03/018956 | 3/2003 |
| WO | 2006030012 A1 | 3/2006 |

* cited by examiner

*Primary Examiner*—Hoang Dang
(74) *Attorney, Agent, or Firm*—Rodney Warfford; David Cate; Jaime Castano

(57) ABSTRACT

Expandable packers and methods of using same are described. The expandable packers include an anti-extrusion layer comprising a fibrous layer having a first surface adjacent an outer surface of an inner expandable elastomeric member, and a cable layer adjacent the fibrous layer, the cable layer comprising a plurality of stacked unidirectional layers of cables. The cable layer is adapted to form a barrier substantially devoid of gaps through which the inner elastomer member would otherwise extrude into upon expansion of the inner elastomeric member. This abstract allows a searcher or other reader to quickly ascertain the subject matter of the disclosure. It will not be used to interpret or limit the scope or meaning of the claims. 37 CFR 1.72(b).

20 Claims, 2 Drawing Sheets

PACKERS AND METHODS OF USE

BACKGROUND OF THE INVENTION

1. Field of Invention

The present invention relates generally to the field of well bore packing tools (otherwise known as packers), and more specifically to expandable packers and methods of using same in various oil and gas well operations.

2. Related Art

Expandable or inflatable packers are well known in the oil industry and have been used for decades for zone isolation, gas/oil ration control, straddle pack services, formation treating, testing and similar operations. These packers are used to block the flow of fluids through the annular space between the pipe and the wall of the adjacent well bore or casing by sealing off the space between them and are placed in a well bore to isolate different zones of interest or production.

Most of the current expandable packers are made with an elastomeric membrane for sealing supported on a metallic structure for mechanical strength. Current expandable packers are assemblies of many different elements such as steel cables, nipples, skirts, and fiber support layers, the latter comprising materials such as the polyaramid fibers known under that trade designation Kevlar™, available from DuPont, for anti-extrusion mechanically joined to an elastomeric packer element. Some constructions provide an integral composite body allowing the integration of fiber support or metal slats within the integral body to provide extrusion resistance and strength (see for example assignee's copending application Ser. No. 11/257,565, filed Oct. 25, 2005). Since the expansion support is achieved by the laminar location of the support fibers or slats, the mechanical connection to these supporting structures is minimized and the strength of the packer is enhanced. Expandable packers of this design may be composed of an inner sealing member, an integrated mechanical structure, and an outer elastomeric layer for sealing. The support system can be made entirely of a composite material and thus integrates the mechanical support elements within a laminar structure of the composite body.

Although these improved designs decrease extrusion of the inner elastomeric member, further problems remain. One problem manifests itself at high temperatures, where the inner rubber layer may be prone to extrusion through any mechanical structure when the packer is inflated. For expandable packers having slats, the slats generally provide good protection against extrusion of the underlying elastomer through the slats, however, the elastomer may exhibit unacceptable dimension recovery after inflation and deflation due to the slats' permanent deformation, and high friction coefficient between slats, making the inflation/deflation difficult at high hydrostatic pressure. Cable packers do not have the permanent deformation problems, and inflation/deflation is easier, however these packers have the problem that at high temperature/high inflation pressure, the inner rubber member is likely to flow through windows existing between cables after inflation. Some means are currently used to prevent this extrusion, such as an aramid fiber layer or a layer of small diameter cables set between a reinforcement layer and the inner elastomeric member. While these may be improvements in certain environments, one problem with small diameter cables is that they do not offer sufficient coverage after packer expansion, leaving some gaps through which the elastomer can extrude. A problem with aramid fiber-based anti-extrusion layers is that aramid fibers such as Kevlar™ may become damaged by mechanical stress and/or high temperature.

Therefore, while there have been some improvements made in expandable packer deign to prevent extrusion of the inner elastomer layer, further improvement is desired.

SUMMARY OF THE INVENTION

In accordance with the present invention, expandable packers and methods of use are described that reduce or overcome problems in previously known expandable packers and methods.

Expandable packers of the invention comprise, in addition to standard non-expandable end connections, an expandable inner elastomeric member, an anti-extrusion layer, and an outer sealing member supported on a metallic structure, wherein the anti-extrusion layer comprises:
  a) a fibrous layer having a first surface adjacent an outer surface of the inner expandable elastomeric member, which may be comprised of aramid fibers such as Kevlar™; and
  b) a cable layer adjacent the fibrous layer, the cable layer comprising a plurality of stacked unidirectional layers of cables, wherein the cable layer is adapted to assume a barrier substantially devoid of gaps through which the inner elastomer member would otherwise extrude into upon expansion of the inner elastomeric member.

In certain embodiments, the cables in the cable layer may have diameters sufficient to allow the cables to move relative to each other if necessary to form the barrier substantially devoid of gaps. The cables in the cable layer may or may not be homogenous in diameter. The diameter of the cables may range from about 0.5 to 5 mm, for example. The cables may be positioned with the same angle relative to a longitudinal axis of the packer, so that they form a homogeneous layer after expansion, without any gap between two cables. The number of unidirectional layers in the cable layer is dependant on the expected expansion ratio, but may range from two layers up to 10 layers or more if necessary. When the expansion ratio of the packer is equal or lower than 100%, two layers of cables may be sufficient. When the expansion ratio is between 100 and 200%, there may be a need for three layers of cables. Higher expansion ratios may require more than three layers of cables.

The fibrous layer is positioned between the cable layer and the inner elastomeric member. In certain embodiments the fibers making up the fibrous layer may form a unidirectional layer that has the same or different direction as the cables in the cable layer. All the fibers may be positioned side by side, with no crossing. More than one unidirectional fibrous layer may be employed. When multiple fibrous layers are employed, the fibers making up the different layers may be oriented differently; for example, the first fibrous layer may be set helicoidally, making an angle of 7° with the longitudinal axis of the packer, while other layers may be substantially parallel to the longitudinal axis of the packer. The second layer may be positioned on the first one, with a different angle. For example, this angle may be −7°. In certain embodiments, it may be useful to have additional fibrous layers with each layer having a specific angle.

When the inner elastomeric member of packers of the invention are expanded, gaps may appear between portions of the mechanical structure supporting the outer sealing member. The cables in the cable layer are pushed against this mechanical structure by inflation pressure, which creates a perpendicular force, held by the cable layer. The fibrous layer is pushed against the cable layer by inflation pressure. As the cables in the cable layer form a homogeneous layer, with no window, the fibers are stressed in transverse compression and see little or no tearing and no tensile stress. The stress on the fibrous layer is much lower than if there were no cable layer, and the expandable packers of the invention can resist much higher inflation pressure.

Expandable packers of the invention include those apparatus that may comprise a straight pull release mechanism, as well as a connector for connecting an end of the packers to coiled tubing or jointed pipe. Yet other embodiments of the expandable packers of the invention comprise an expandable packer wherein the expandable portion comprises continuous strands of polymeric fibers cured within a matrix of an integral composite tubular body extending from a first non-expandable end to a second non-expandable end of the body. Other embodiments of expandable packers of the invention comprise continuous strands of polymeric fibers bundled along a longitudinal axis of the expandable packer body parallel to longitudinal cuts in a laminar interior portion of the expandable body to facilitate expansion of the expandable portion of the integral composite tubular body. Certain other expandable packer embodiments of the present invention comprise a plurality of overlapping reinforcement members made from at least one of the group consisting of high strength alloys, fiber-reinforced polymers and/or elastomers, nanofiber, nanoparticle, and nanotube reinforced polymers and/or elastomers. Yet other expandable packer embodiments of the present invention include those wherein the reinforcement members have an angled end adjacent the non-expandable first end and adjacent the non-expandable second end to allow expansion of the expandable portion of the tubular body. Another embodiment of the present invention comprises, an expandable packer wherein the angle of the reinforcement end portions is about 54° from the longitudinal axis of the expandable packer body.

Another aspect of the invention are methods of using the inventive packers, one method of the invention comprising:
 (a) running a packer of the invention to depth in a well bore on coiled tubing or jointed pipe; and
 (b) inflating the inner elastomeric member and causing the outer sealing member to expand against a well bore, whereby the inner elastomeric member is reduced or prevented from extruding into the support structure.

Methods of the invention include those comprising releasing the packer from the well bore, wherein the inner elastomeric members return substantially to their original shape. Other methods of the invention are those including running the packer to another location in the well bore, and repeating step (b). Other methods of the invention include prior to step (a) selecting a number of layers of cable for the cable layer sufficient to create the barrier of step (c) based on an expansion ratio expected for the packer in step (b), and other methods comprise calculating an expected expansion ratio prior to the selecting of the number of layers of cable.

These and other features of the apparatus and methods of the invention will become more apparent upon review of the brief description of the drawings, the detailed description of the invention, and the claims that follow.

BRIEF DESCRIPTION OF THE DRAWINGS

The manner in which the objectives of the invention and other desirable characteristics can be obtained is explained in the following description and attached drawings in which.

Figure 1:
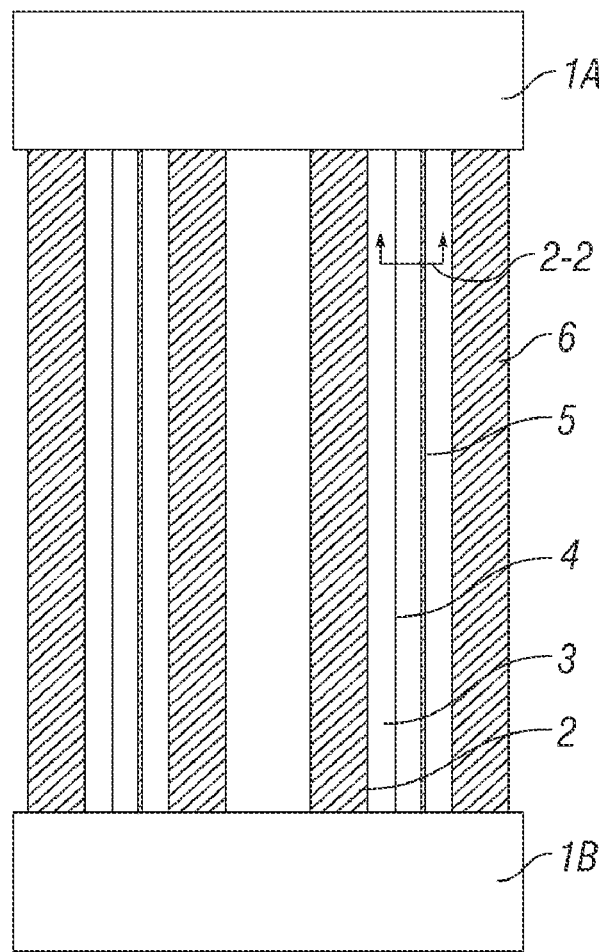
FIG. 1 is a schematic cross-section view of an expandable packer according to one embodiment of the invention.

It is to be noted, however, that the appended drawings are not to scale and illustrate only typical embodiments of this invention, and are therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

All phrases, derivations, collocations and multiword expressions used herein, in particular in the claims that follow, are expressly not limited to nouns and verbs. It is apparent that meanings are not just expressed by nouns and verbs or single words. Languages use a variety of ways to express content. The existence of inventive concepts and the ways in which these are expressed varies in language-cultures. For example, many lexicalized compounds in Germanic languages are often expressed as adjective-noun combinations, noun-preposition-noun combinations or derivations in Romanic languages. The possibility to include phrases, derivations and collocations in the claims is essential for high-quality patents, making it possible to reduce expressions to their conceptual content, and all possible conceptual combinations of words that are compatible with such content (either within a language or across languages) are intended to be included in the used phrases.

The invention describes expandable packers and methods of using same in well bores. A "well bore" may be any type of well, including, but not limited to, a producing well, a non-producing well, an experimental well, and exploratory well, and the like. Well bores may be vertical, horizontal, some angle between vertical and horizontal, diverted or non-diverted, and combinations thereof, for example a vertical well with a non-vertical component. Although existing expandable packers have been improved over the years, these improved designs have left some challenging problems regarding extrusion of the inner elastomeric member. One problem manifests itself at high temperatures, where the inner elastomeric member or layer may be prone to extrusion through any mechanical structure when the packer is inflated. For expandable packers having slats, the slats generally provide good protection against extrusion of the underlying elastomer through the slats, however, the elastomer may exhibit unacceptable dimension recovery after inflation and deflation due to the slats' permanent deformation, and high friction coefficient between slats, making the inflation/deflation difficult at high hydrostatic pressure. So-called "cable packers", expandable packers having large diameter cables therein for structurally supporting the outer sealing member, do not have the permanent deformation problems, and inflation/deflation is easier, however existing cable packers have the problem that at high temperature/high inflation pressure, the inner rubber member is likely to flow through windows (gaps)

existing between cables after inflation. Some means are currently used to prevent this extrusion, such as an aramid fiber layer or a layer of small diameter cables set between a reinforcement layer and the inner elastomeric member. While these may be improvements in certain environments, one problem with small diameter cables is that they do not offer sufficient coverage after packer expansion, still leaving some gaps through which the elastomer can extrude. A problem with aramid fiber-based anti-extrusion layers is that aramid fibers such as Kevlar™ may become damaged by mechanical tensile stress and/or high temperature, and thus degrade over time. Thus, there is a continuing need for expandable packers and methods that address one or more of the problems that are set forth above.

Referring to the drawings in detail, FIG. 1 shows a schematic diagram, not to scale, of an expandable packer of the invention having with a longitudinal bore therethrough according to one embodiment of the invention. The packer has non-expandable first and seconds ends 1A and 1B, and an expandable body comprised of an inner elastomeric member 2, a fibrous layer 3, a cable layer 4, and a structural support 5 that supports an outer elastomeric sealing member 6. Inner elastomeric member 2 and sealing member 6 may comprise a composite material or a mixture of composites, including one or more laminated elastomeric layers to allow expansion of the packer upon the application of internal fluid pressure. Member 2 and sealing member 6 may be constructed as a single piece of composite or multiple sections of composite material that can be layered together before curing and setting of the composite resins. The composite may be fabricated with a plurality of single fibers (not shown) extending from first end 1A to second end 1B longitudinally arranged around the body. The fibers may be positioned during manufacture so there is no mechanical discontinuity between the expandable and non-expandable sections of the packer. These continuous fibers inserted from a first end 1A of the packer to the opposite end 1B, provide substantial support to the fully expanded packer.

The expandable portion of the expandable packer is positioned between the first 1A and second 1B non-expandable ends of the structure. Each end 1A and 1B of the packer body 10 may be adapted to be attached in a tubular string. This can be through threaded connection, friction fit, expandable sealing means, and the like, all in a manner well known in the oil tool arts. Although the term tubular string is used, this can include jointed or coiled tubing, casing or any other equivalent structure for positioning the packer. The materials used can be suitable for use with production fluid or with an inflation fluid.

Elastomeric sealing member 6 engages an adjacent surface of a well bore, casing, pipe, tubing, and the like. Other elastomeric layers between the inner and outer elastomeric members 2 and 6 may be provided for additional flexibility and backup for inner elastomeric member 2. A non-limiting example of an elastomeric element is rubber, but any elastomeric materials may be used. A separate membrane may be used with an elastomeric element if further wear and puncture resistance is desired. A separate membrane may be interleaved between elastomeric elements if the elastomeric material is insufficient for use alone. The elastomeric material of outer sealing member 6 should be of sufficient durometer for expandable contact with a well bore, casing, pipe or similar surface. The elastomeric material should be of sufficient elasticity to recover to a diameter smaller than that of the well bore to facilitate removal therefrom. The elastomeric material should facilitate sealing of the well bore, casing, or pipe in the inflated state.

"Elastomer" as used herein is a generic term for substances emulating natural rubber in that they stretch under tension, have a high tensile strength, retract rapidly, and substantially recover their original dimensions. The term includes natural and man-made elastomers, and the elastomer may be a thermoplastic elastomer or a non-thermoplastic elastomer. The term includes blends (physical mixtures) of elastomers, as well as copolymers, terpolymers, and multi-polymers. Examples include ethylene-propylene-diene polymer (EPDM), various nitrile rubbers which are copolymers of butadiene and acrylonitrile such as Buna-N (also known as standard nitrile and NBR). By varying the acrylonitrile content, elastomers with improved oil/fuel swell or with improved low-temperature performance can be achieved. Specialty versions of carboxylated high-acrylonitrile butadiene copolymers (XNBR) provide improved abrasion resistance, and hydrogenated versions of these copolymers (HNBR) provide improve chemical and ozone resistance elastomers. Carboxylated HNBR is also known. Other useful rubbers include polyvinylchloride-nitrile butadiene (PVC-NBR) blends, chlorinated polyethylene (CM), chlorinated sulfonate polyethylene (CSM), aliphatic polyesters with chlorinated side chains such as epichlorohydrin homopolymer (CO), epichlorohydrin copolymer (ECO), and epichlorohydrin terpolymer (GECO), polyacrylate rubbers such as ethylene-acrylate copolymer (ACM), ethylene-acrylate terpolymers (AEM), EPR, elastomers of ethylene and propylene, sometimes with a third monomer, such as ethylene-propylene copolymer (EPM), ethylene vinyl acetate copolymers (EVM), fluorocarbon polymers (FKM), copolymers of poly(vinylidene fluoride) and hexafluoropropylene (VF2/HFP), terpolymers of poly(vinylidene fluoride), hexafluoropropylene, and tetrafluoroethylene (VF2/HFP/TFE), terpolymers of poly(vinylidene fluoride), polyvinyl methyl ether and tetrafluoroethylene (VF2/PVME/TFE), terpolymers of poly(vinylidene fluoride), hexafluoropropylene, and tetrafluoroethylene (VF2/HPF/TFE), terpolymers of poly(vinylidene fluoride), tetrafluoroethylene, and propylene (VF2/TFE/P), perfluoroelastomers such as tetrafluoroethylene perfluoroelastomers (FFKM), highly fluorinated elastomers (FEPM), butadiene rubber (BR), polychloroprene rubber (CR), polyisoprene rubber (IR), . . . (IM), polynorbornenes, polysulfide rubbers (OT and EOT), polyurethanes (AU) and (EU), silicone rubbers (MQ), vinyl silicone rubbers (VMQ), fluoromethyl silicone rubber (FMQ), fluorovinyl silicone rubbers (FVMQ), phenylmethyl silicone rubbers (PMQ), styrene-butadiene rubbers (SBR), copolymers of isobutylene and isoprene known as butyl rubbers (IIR), brominated copolymers of isobutylene and isoprene (BIIR) and chlorinated copolymers of isobutylene and isoprene (CIIR).

The expandable portions of the packers of the invention may include continuous strands of polymeric fibers cured within the matrix of the integral composite body comprising elastomeric members 2 and 6. Strands of polymeric fibers may be bundled along a longitudinal axis of the expandable packer body parallel to longitudinal cuts in a laminar interior portion of the expandable body. This can facilitate expansion of the expandable portion of the composite body yet provide sufficient strength to prevent catastrophic failure of the expandable packer upon complete expansion.

The expandable portions of the packers of the invention may also contain a plurality of overlapping reinforcement members. These members may be constructed from any suitable material, for example high strength alloys, fiber-reinforced polymers and/or elastomers, nanofiber, nanoparticle, and nanotube reinforced polymers and/or elastomers, or the like, all in a manner known and disclosed in U.S. patent application Ser. No. 11/093,390, filed on Mar. 30, 2005, entitled "Improved Inflatable Packers", the entirety of which is incorporated by reference herein.

Figure 2:
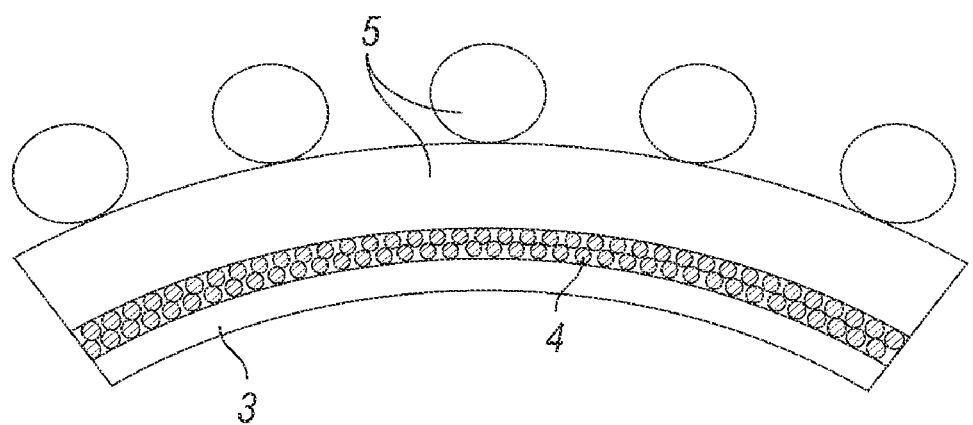
FIG. 2 is a schematic cross-section view of a portion of the expandable packer of FIG. 1 illustrating an anti-extrusion layer in accordance with the invention.

FIG. 2 is a schematic cross sectional view along 2-2 of FIG. 1 of a portion of the packer illustrated in FIG. 1. Fibrous layer 3 and cable layer 4 are illustrated in non-expanded state. Also illustrate is a portion of mechanical support structure 5. Inner elastomeric member 2 and outer sealing member 6 are not shown. Fibrous layer 3 is positioned between cable layer 4 and inner elastomeric member 2. In certain embodiments the fibers making up fibrous layer 3 may form a unidirectional layer that has the same or different direction as the cables in cable layer 4. All the fibers may be positioned side by side, with no crossing. More than one unidirectional fibrous layer may be employed, as further discussed in relation to FIG. 4.

Figure 3:
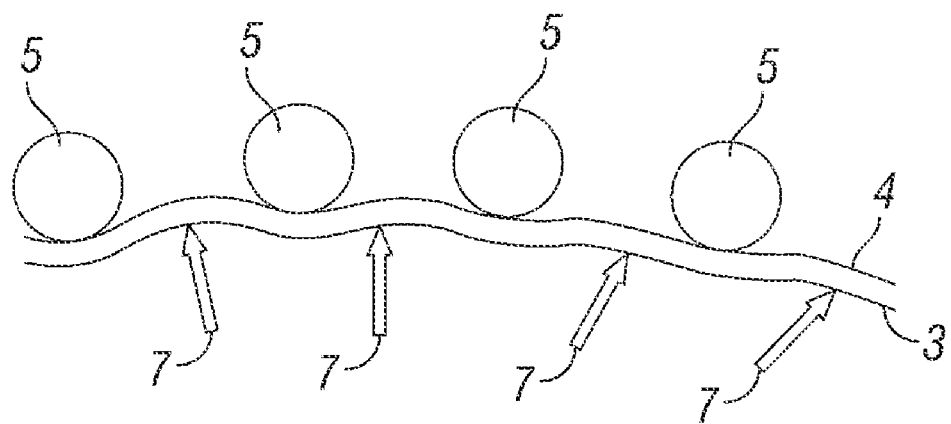
FIG. 3 is a schematic sectional view of a portion of the expandable packer of FIG. 1 illustrating how an anti-extrusion layer in accordance with the invention acts during expansion to limit tensile stress on a fibrous portion of the anti-extrusion layer.

FIG. 3 is a schematic cross sectional view of a portion of the expandable packer of FIG. 1 illustrating how an anti-extrusion layer in accordance with the invention acts during expansion to limit tensile stress on a fibrous layer 3 of the anti-extrusion layer. When the inner elastomeric member 2 of packers of the invention are expanded, gaps may appear between portions of the mechanical structure 5 supporting the outer sealing member 6 (not shown). The cables in cable layer 4 are pushed against mechanical structure 5 by inflation pressure, which creates a force 7 transverse of the longitudinal axis of the packer, held by cable layer 4. Fibrous layer 3 is pushed against cable layer 4 by inflation pressure 7. As the cables in cable layer 4 form a homogeneous layer, with no or very few windows or gaps, the fibers in fibrous layer 3 are stressed in transverse compression and see little or no tearing and no tensile stress. The stress on fibrous layer 3 is much lower than if there were no cable layer 4, and the expandable packers of the invention can resist much higher inflation pressure.

Figure 4:
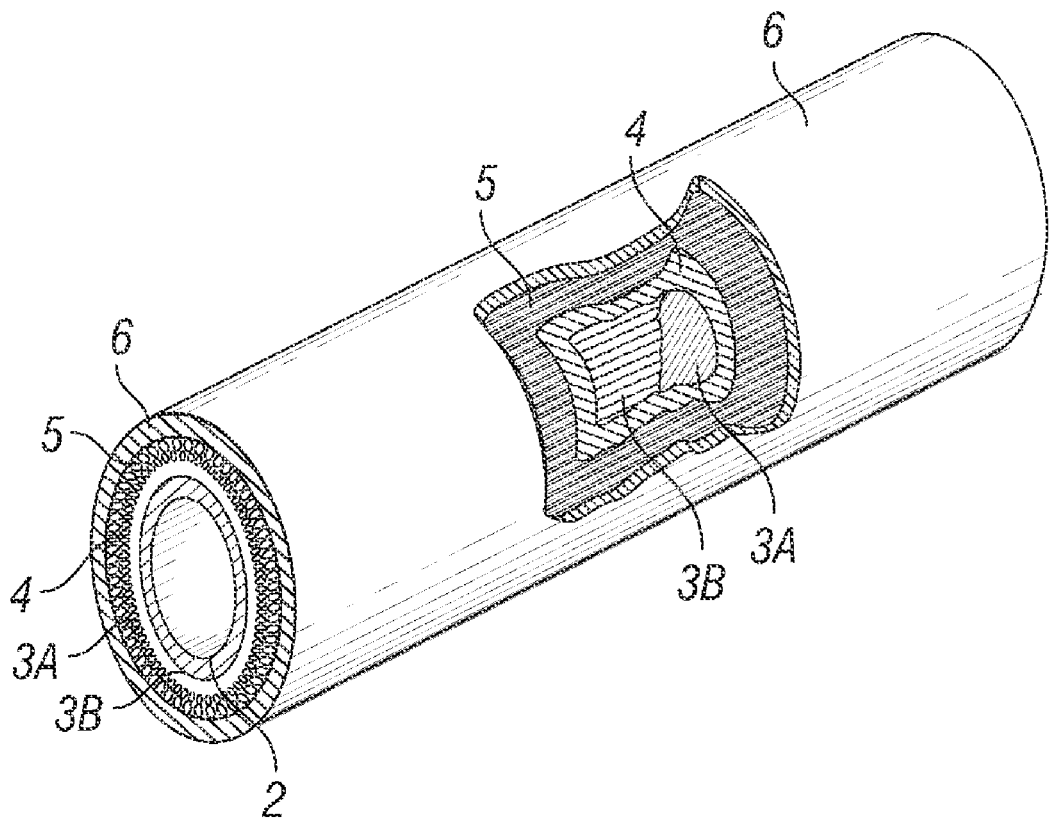
FIG. 4 is a perspective view, with portions broken away, of an expandable packer of the invention illustrating different orientation of two fibrous layers, according to one embodiment of the invention.

FIG. 4 is a perspective view, with portions broken away, of an expandable packer of the invention illustrating different orientation of two fibrous layers 3A and 3B, according to one embodiment of the invention. The fibrous layers may comprise polymeric fibers, or any fiber known in the art that is sufficiently flexible for use in an expandable packer. When multiple fibrous layers 3 are employed, and the fibers making up the different layers may be oriented differently; for example, first fibrous layer 3A may be set helicoidally, making an angle of with the longitudinal axis of the packer, for example ranging from about 1° to about 20°, while other layers may be substantially parallel to the longitudinal axis of the packer. Second fibrous layer 3B may be positioned on the first one, with a different angle. For example, this angle may range from −1° to about −20°. In certain embodiments, it may be useful to have additional fibrous layers 3 with each layer having a specific angle.

Expandable packers of the invention may be constructed of a composite or a plurality of composites so as to provide flexibility in the packer. The expandable portions of the inventive packers may be constructed out of an appropriate composite matrix material, with other portions constructed of a composite sufficient for use in a well bore, but not necessarily requiring flexibility. The composite is formed and laid by conventional means known in the art of composite fabrication. The composite can be constructed of a matrix or binder that surrounds a cluster of polymeric fibers. The matrix can comprise a thermosetting plastic polymer which hardens after fabrication resulting from heat. Other matrices are ceramic, carbon, and metals, but the invention is not so limited to those resins. The matrix can be made from materials with a very low flexural modulus close to rubber or higher, as required for well conditions. The composite body may have a much lower stiffness than that of a metallic body, yet provide strength and wear impervious to corrosive or damaging well conditions. The composite packer body may be designed to be changeable with respect to the type of composite, dimensions, number of cable and fibrous layers, and shapes for differing down hole environments.

To use, the expandable packer is inserted into a well bore by conventional means (for example on a tubular string) adjacent to the area to be sealed. The packer is expanded by fluidic or other means until the desired seal is affected. If desired to be removed, the fluidic or other means are disengaged so at to allow the packer to recover a diameter smaller than that of the well bore to facilitate removal therefrom.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, no clauses are intended to be in the means-plus-function format allowed by 35 U.S.C. § 112, paragraph 6 unless "means for" is explicitly recited together with an associated function. "Means for" clauses are intended to cover the structures described herein as performing the recited function and not only structural equivalents, but also equivalent structures.

What is claimed is:

1. An expandable packer comprising:
  a) a fibrous layer having a first surface adjacent an outer surface of an inner expandable elastomeric member; and
  b) a cable layer adjacent the fibrous layer, the cable layer comprising a plurality of stacked unidirectional layers of cables,
  wherein the cable layer is adapted to form a barrier substantially devoid of gaps through which the inner elastomer member would otherwise extrude into upon expansion of the inner elastomeric member.

2. The apparatus of claim 1 wherein the fibrous layer comprises aramid fibers.

3. The apparatus of claim 1 wherein the cables in the cable layer have diameters sufficient to allow the cables to move relative to each other to form the barrier substantially devoid of gaps.

4. The apparatus of claim 1 wherein the cables in the cable layer are homogenous in diameter.

5. The apparatus of claim 1 wherein the cables are positioned with the same angle relative to a longitudinal axis of the packer, and adapted to form a homogeneous layer after expansion of the inner elastomeric member, without any gap between two cables.

6. The apparatus of claim 1 wherein the number of unidirectional layers in the cable layer ranges from two layers up to 10 layers.

7. The apparatus of claim 1 wherein fibers making up the fibrous layer may form a unidirectional layer that has the same orientation as the cables in the cable layer, with all the fibers positioned side by side, with no crossing.

8. The apparatus of claim 1 comprising more than one unidirectional fibrous layer, wherein fibers making up the different layers may be oriented the same or differently from layer to layer.

9. The apparatus of claim 8 wherein a second fibrous layer is positioned adjacent the first fibrous layer, with fibers in the second layer being oriented at an angle which is the negative to that of the angle of the first fibrous layer.

10. The apparatus of claim 1 wherein the fibrous layer and the cable layer are cured within a matrix of an integral composite tubular body extending from a first non-expandable end to a second non-expandable end of the body.

11. The apparatus of claim 10 wherein the integral composite body comprises continuous strands of polymeric fibers bundled along a longitudinal axis of the tubular body parallel to longitudinal cuts in a laminar interior portion of the tubular body to facilitate expansion of the integral composite tubular body.

12. The apparatus of claim 10 wherein the matrix comprises a plurality of overlapping reinforcement members made from at least one of the group consisting of high strength alloys, fiber-reinforced polymers and/or elastomers, nanofiber, nanoparticle, and nanotube reinforced polymers and/or elastomers.

13. The apparatus of claim 11 wherein the reinforcement members have an angled end adjacent the non-expandable first end and adjacent the non-expandable second end to allow expansion of the tubular body.

14. The apparatus of claim 13 wherein the angle of the reinforcement end portions is about 54° from the longitudinal axis of the packer body.

15. A packer for use in a subterranean well, comprising
  a) first and second non-expandable end connections, an expandable inner elastomeric member, an anti-extrusion layer, and an outer sealing member supported on a metallic structure;
  b) the anti-extrusion layer comprising a polyaramid layer having a first surface adjacent an outer surface of the inner expandable elastomeric member, and a cable layer adjacent the fibrous layer, the cable layer comprising a plurality of stacked unidirectional layers of cables, wherein the cable layer is adapted to form a barrier substantially devoid of gaps through which the inner elastomer member would otherwise extrude into upon expansion of the inner elastomeric member.

16. A method of using a packer, comprising:
  (a) running an expandable packer to depth in a well bore on coiled tubing or jointed pipe, the expandable packer comprising an anti-extrusion layer comprising a fibrous layer having a first surface adjacent an outer surface of the inner expandable elastomeric member, and a cable layer adjacent the fibrous layer, the cable layer comprising a plurality of stacked unidirectional layers of cables;
  (b) expanding an inner elastomeric member in the expandable packer so that an outer seal member of the packer seals the well bore; and
  (c) creating a barrier using the cable layer that is substantially devoid of gaps through which the inner elastomeric member would otherwise extrude into upon expansion of the inner elastomeric member.

17. The method of claim 16 comprising releasing the packer from the well bore, wherein the inner elastomeric member returns substantially to its original shape.

18. The method of claim 17 comprising running the packer to another location in the well bore, and repeating step (b).

19. The method of claim 16 comprising prior to step (a) selecting a number of layers of cable for the cable layer sufficient to create the barrier of step (c) based on an expansion ratio expected for the packer in step (b).

20. The method of claim 19 comprising calculating an expected expansion ratio prior to the selecting of the number of layers of cable.

* * * * *